United States Patent Office 3,108,042
Patented Oct. 22, 1963

3,108,042
CORTICOTROPIN REACTION COMPLEXES
Hubert W. Murphy, Gerald W. Probst, and Verlin C. Stephens, Indianapolis, Ind., assignors to Eli Lilly and Company, Indianapolis, Ind., a corporation of Indiana
No Drawing. Filed Apr. 7, 1952, Ser. No. 281,041
11 Claims. (Cl. 167—58)

This invention relates to the adrenocorticotropic hormone and more particularly to complexes of corticotropin with certain polybasic acids derivable from carbohydrates.

Corticotropin, which is an adrenocorticotropic hormone derived from the anterior pituitary gland, and which for brevity is often referred to as ACTH, is widely used for its valuable therapeutic effects in various disease conditions, for example, rheumatism, arthritis, and the like. ACTH therapy, while productive of results not obtainable with any other medication, is nevertheless subject to a serious disadvantage in that frequently repeated injections are necessary in order to secure a substantially continuous therapeutic effect. Accordingly, some means of prolonging the period of time over which ACTH exerts its action is highly desirable.

We have found that ACTH compositions capable of providing a prolonged therapeutic effect are obtained when corticotropin is treated with a carbohydrate-derivable polybasic acid having molecular weight in excess of about 800 to form a reaction complex of corticotropin with the acid. The complex thus formed is substantially insoluble in water, but is readily suspendable or dispersible in water or other pharmaceutical extending media. In such form it can be administered parenterally for therapeutic purposes.

Corticotropin is commonly obtained by the extraction of pituitary glands. As commercially available, it contains varied quantities of extraneous glandular material. However, the presence of these gland substances is without apparent effect on the preparation of the new complexes of this invention. It is therefore possible to produce reaction complexes of the carbohydrate-derivable acids of this invention with ACTH of any degree of purity. The ACTH available commercially in the form of a preparation containing about four so-called ACTH units per mg. is well suited to the preparation of the compounds of this invention, as are preparations of greater or lesser purity.

Broadly speaking, the new corticotropin-containing reaction complexes are formed by admixture of the selected carbohydrate-derivable acid with a solution of ACTH in aqueous alkali, and acidification of the resulting solution, to throw down a precipitate of the reaction complex of the carbohydrate-derivable acid with ACTH. The precipitate is filtered off, and is washed to remove any soluble impurities which may be present. Complexes formed by the above procedure are rendered suitable for injection by incorporating them into appropriate pharmaceutical extending media, for example, isotonic saline solution, vegetable oils and other vehicles. If desired, suspending agents can be added to assist in the maintenance in suspension of the complex, and to permit of its ready resuspension.

Alternatively, compositions capable of providing a prolonged therapeutic effect can be obtained directly and without isolation procedures by adding an aqueous alkaline solution of the carbohydrate-derivable acid to an aqueous alkaline solution of ACTH, and adjusting the pH of the solution by the addition of acid to a pH suitable for parenteral administration. Suspensions obtained in this manner are capable of producing a prolonged ACTH action.

The amount of carbohydrate-derivable acid which is used is preferably an amount slightly in excess of that required for the complete precipitation of the ACTH. This quantity is readily determined for each ACTH preparation used by careful titration of an aliquot amount of the ACTH solution with a carbohydrate-derivable acid solution of known concentration until no additional precipitation is caused by the further addition of the acid. Examples of carbohydrate-derivable polybasic acids suitable for the preparation of corticotropin complexes are pectic acid, alginic acid, cellulose sulfate, carboxymethylcellulose, carboxyethylcellulose, carboxymethylhydroxyethylcellulose, cellulose acetate phthalate and the like. It will be evident to those skilled in the art that the combination of acidic properties and relatively high molecular weight are the determining factors in selecting the carbohydrate-derivable acids suitable for use in preparation of the complexes of this invention. Thus, such acids of molecular weight over about 800 appear to yield a substantially quantitative precipitate, as a complex, of the ACTH present in the original solution of corticotropin-containing material.

The following examples illustrate the preparation of the corticotropin-carbohydrate-derivable acid reaction complexes and their incorporation into compositions suitable for therapeutic use.

Example 1

To 10 cc. of a 1 percent solution of ACTH (containing 4.75 units per mg. as determined by the ascorbic acid depletion method) were added successive small increments of 0.5 percent aqueous pectic acid, and the precipitate formed after each addition was removed by centrifugation. It was found that 16 cc. of pectic acid solution were required for complete precipitation of the ACTH. On a weight basis, 1 g. of ACTH containing 4.75 units per mg. was quantitatively bound by 0.8 g. of pectic acid. The gelatinous precipitate, comprising a complex of ACTH and pectic acid, was twice washed with water and suspended in 15 cc. of water. When assayed, it was found that the complex contained substantially all of the ACTH originally present in the solution.

Example 2

To 50 cc. of a 1 percent solution of corticotropin containing 4.75 units per mg. were added with stirring 17.8 cc. of 1 percent aqueous alginic acid (having pH 4.0). A precipitate of the alginic acid-corticotropin complex formed and was removed by centrifugation.

Alginic acid-corticotropin reaction complex thus prepared was found upon assay to contain substantialy all of the corticotropin theoretically present in the original solution.

Example 3

917 mg. of ACTH having a potency of 3 units per mg. were dissolved in 10 cc. of isotonic saline solution. The pH of the solution was adjusted to 3.3 with 2 percent aqueous sodium hydroxide and a sufficient quantity of isotonic saline solution was added to bring the total volume to 15 cc. The solution was filtered and added slowly with vigorous mixing to 28 cc. of a solution containing 350 mg. of pectic acid in isontonic saline solution and having pH about 3.3. A cream colored precipitate formed, and was permitted to settle. To the supernatant liquid there was added 0.14 cc. of U.S.P. liquefied phenol, and the pH of the suspension was adjusted to 4.0 with 2 percent sodium hydroxide solution. Sufficient isotonic saline solution was added to make a total of 50 cc., and the suspension was placed in 10 cc. rubber stoppered vials. The vials were sterilized by heating at 60° C. for one hour on each of three successive days. When injected intramuscularly in amount of 1 cc., the preparation exerted a prolonged adrenocorticotropic effect.

Example 4

A solution of 0.8 g. of medium viscosity sodium carboxymethylcellulose in 30 cc. of freshly distilled water was filtered through a coarse sintered glass funnel and 0.14 cc. of liquified phenol and 0.05 cc. of octyl alcohol were added thereto. The solution was made strongly basic by the addition of 0.2 cc. of 47 percent sodium hydroxide solution. To the basic solution was added slowly with stirring a filtered solution of 0.917 g. of ACTH (3 units per mg.) in 15 cc. of water. To the resulting clear solution was slowly added with vigorous stirring a 4 percent solution of hydrochloric acid until the pH of the mixture was 3.9, whereupon a fine suspension of the carboxymethylcellulose-ACTH complex formed. Sufficient water was added to the solution to make the volume 50 cc., and the suspension was filled, while stirring, into 10 cc. rubber stoppered vials. The vials were sterilized by heating at 60° C. for one hour for three successive days. When injected intramuscularly, a prolonged adrenocorticotropic effect was produced in the subject.

Example 5

The procedure of Example 4 was followed, except that sodium carboxymethylhydroxyethyl cellulose was used. A precipitate consisting of carboxymethylhydroxyethyl cellulose-corticotropin reaction complex formed. The suspended precipitate, when injected parenterally, produced a prolonged therapeutic effect.

Example 6

A solution of 0.46 g. of sodium cellulose sulfate in 15 cc. of freshly distilled water was filtered, and 0.14 cc. of liquified phenol and 0.05 cc. of octyl alcohol were added thereto. To the resulting solution were added 20 cc. of a solution containing 0.917 g. of ACTH (3 units per mg.). During the addition a slight precipitate was formed and was redissolved by the addition of 0.2 cc. of 47 percent sodium hydroxide. The pH of the combined solutions was gradually lowered to pH 3.5 by the addition of 4 percent hydrochloric acid solution, whereupon a precipitate of the cellulose sulfate-ACTH complex formed. Sufficient water was added to the mixture to make the total volume 50 cc. and the preparation was filled into 10 cc. rubber stoppered vials. The vials were sterilized by heating in the usual way. When injected intramuscularly, a prolonged therapeutic effect was achieved.

We claim:

1. A substantially water-insoluble reaction complex comprising corticotropin and a member of the group consisting of pectic acid, alginic acid, carboxymethylcellulose, carboxymethylhydroxyethylcellulose and cellulose sulfate.

2. A reaction complex of corticotropin with pectic acid.

3. A reaction complex of corticotropin with alginic acid.

4. A reaction complex of corticotropin with carboxymethylcellulose.

5. A reaction complex of corticotropin with cellulose sulfate.

6. A reaction complex of corticotropin with carboxymethylhydroxyethylcellulose.

7. A therapeutic composition comprising a reaction complex of corticotropin with a member of the group consisting of pectic acid, alginic acid, carboxymethylcellulose, carboxymethylhydroxyethylcellulose, and cellulose sulfate, dispersed in an injectable pharmaceutical extending medium.

8. A composition according to claim 7, in which the extending medium is isotonic saline solution.

9. A preparation comprising the reaction product of corticotrophin and pectic acid.

10. A preparation comprising the reaction product of corticotrophin and alginic acid.

11. A preparation comprising the reaction product of corticotrophin and carboxymethylcellulose.

References Cited in the file of this patent

UNITED STATES PATENTS

| | | |
|---|---|---|
| 2,294,016 | Brahn | Aug. 25, 1942 |
| 2,486,937 | Ferguson | Nov. 1, 1949 |
| 2,491,537 | Welch | Dec. 20, 1949 |
| 2,650,217 | Macek | Aug. 25, 1953 |

OTHER REFERENCES

Ouer: Annals of Allergy, volume 9, No. 3, May-June 1951, pages 346–353 (pp. 346 to 348 relied upon).

Science News Letters, Oct. 4, 1947, p. 210.

Mote: Procs. 2d Clin. ACTH Conf. Therapeutics, vol. 2, 1951, p. 2.

Hackh: Hackh's Chemical Dictionary, 1944, Blakiston Co., Phila., Pa., page 621.

Lesser Drug and Cosmetic Ind., pp. 750–752, vol. 62, June 1948 (p. 752 relied upon).

J.A.C.S., pp. 2969–2970, vol. 73, June 1951.